United States Patent [19]

Fields et al.

[11] Patent Number: 4,586,547
[45] Date of Patent: May 6, 1986

[54] BALL VALVE PURGE DEVICE FOR TANK CARS

[75] Inventors: Stephen F. Fields, Wilmette; C. K. Krishnakumar, Lombard, both of Ill.

[73] Assignee: General American Transportation Corporation, Chicago, Ill.

[21] Appl. No.: 611,721

[22] Filed: May 18, 1984

[51] Int. Cl.⁴ ............................ B65B 1/04; B65B 3/04
[52] U.S. Cl. ..................................... 141/35; 137/575; 141/98; 141/232
[58] Field of Search ................. 141/35, 36, 1, 98, 234, 141/336, 337, 231–233, 192, 198; 137/575, 571, 1

[56] References Cited
U.S. PATENT DOCUMENTS
3,722,556 3/1973 Jeffers et al. ............................ 141/2

Primary Examiner—Stephen Marcus
Assistant Examiner—Ernest G. Cusick
Attorney, Agent, or Firm—Hill, Van Santen, Steadman & Simpson

[57] ABSTRACT

A novel ball valve type purging device for a tank train ball valve purging device wherein a one-way valve is connected in an upper portion of a long vertical interconnecting pipe between adjacent cars of a string of tank cars so as to let gas pass from the long vent pipe into the top of the tank car and eliminates or minimizes the necessity to blow gas or air through the car commodity during purging of the interconnects and greatly reduces the pressure and quantities of purge gas required. The structure of the invention effectively eliminates the limitation on the length of a string of cars due to the purging requirements and the reduction of the quantity of purge gas substantially reduces the cost of purging particularly wherein inert or bottled gas such as nitrogen is utilized.

8 Claims, 3 Drawing Figures

BALL VALVE PURGE DEVICE FOR TANK CARS

BACKGROUND OF THE INVENTION

1. Field of the Invention

This invention relates in general to railway tank cars and particularly to tank cars which are connected by manifolds so as to allow them to be loaded or unloaded from a single car of the interconnected cars without moving the train so that the cars can be consecutively loaded and unloaded.

2. Description of the Prior Art

A number of patents have issued on systems and apparatus for loading a string of tank cars from a single location wherein the cars are loaded from manifolds extending between them so that the entire series of cars can be loaded. For example, U.S. Pat. No. 3,897,807 entitled "Manifoled Tank Cars For Unit Train Service" discloses such system and explains the requirements for providing a free vapor space or "outage" above the liquid lading at the top of the tanks and furthermore describes the desirability of maintaining the flexible connecting conduits between adjacent tank cars empty of lading. The description of this patent relating to this problem is hereby incorporated by reference. Other patents which describe various apparatus for interconnecting tank cars for unit train service are U.S. Pat. Nos. 4,079,760, 4,002,192, 4,304,271, 4,008,739 and 4,007,766. The disclosure in these patents is hereby incorporated by reference.

SUMMARY OF THE INVENTION

This invention relates to a ball valve type purging device which allows flow through it in only one direction. The device is attached to a port in the long vertical leg of an interconnecting pipe between adjacent cars of a train of tank cars and eliminates and minimizes the necessity of blowing gas or air through the car commodity during purging of the interconnects and greatly reduces the pressures and quantities of purge gas required. By reducing the purge pressure, the invention effectively eliminates the limitation on the length of a string of cars due to purging requirements. Reduction of the quantity of purge gas is important where air cannot be used for purging and inert gas such as bottled nitrogen is necessary.

The main features of the invention comprise a valve assembly which has a spherical ball with a ball seat made of a material that is compatible with the commodity being transported. Alumina or Teflon is satisfactory for most high volume commodities. A cage-like valve retainer limits the rise of the valve and replacement of the spherical ball or ball seat can be easily accomplished by unscrewing a number of bolts which connect flanges that hold the ball in place. The valve may be attached as by welding to the long vertical leg of the interconnecting pipe with a short elbow. During purging, the spherical ball will be lifted off its seat due to the gas or air pressure and gas or air flows through the annular space between the ball and its seat and then through the outage space in the car into the short interconnecting pipe at the other end of the car to the next interconnect. The oscillatory motion of the ball prevents coating by the commodity of its surface and of the seat and this ensures troublefree performance of the valve over a long period of time. Also, since the ball and its seat are made of the same material, the wear will be minimized and the life of the valve extended. The only moving part in the assembly is the ball itself and there are no intricate elements and, thus, the valve will last for a long time.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

The present invention comprises an improvement on the apparatus described in U.S. Pat. No. 3,897,807 entitled "Manifoled Tank Cars For Unit Train Service" which issued on Aug. 5, 1975 and is assigned to the assignee of the present invention. The disclosure in this patent is hereby incorporated by reference and generally discusses the loading of a string of tank cars from a single point such that liquid lading can be supplied to a first tank car after which it is filled adjacent and subsequent tank cars will one by one be filled through flexible conduits between the cars until the last tank car in the string has been filled with the liquid lading material. As described in this patent, the flexible conduits which are connected by quick disconnects that extend between adjacent tank cars are purged with gas such as air or nitrogen after the tank cars have been filled with liquid so that during movement of the train the flexible conduits will not contain liquid but will contain air or gas. Thus, if the flexible conduits are broken or ruptured, the liquid in them will not be spilled or discharged. In the apparatus disclosed in U.S. Pat. No. 3,897,807, such purging of the flexible conduits occurs by injecting air or gas into the first tank car and the string which forces liquid in the flexible connecting conduits out of the conduits and into the next car in the string and so on until all of the flexible conduits have been purged of liquid.

Figure 1:
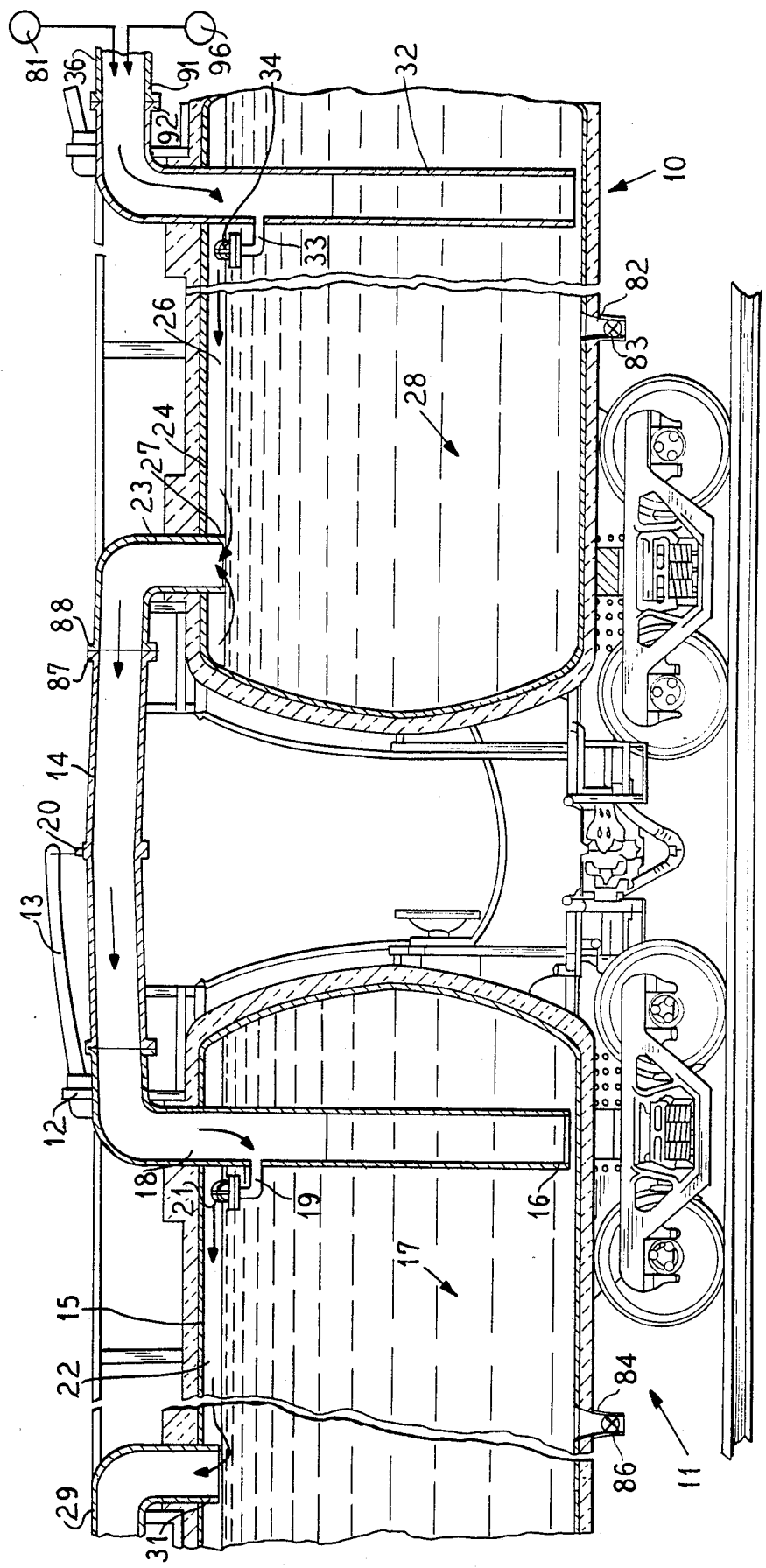
FIG. 1 is a sectional view of a pair of adjoining interconnected tank cars illustrating the invention.

As illustrated in FIG. 1, two tank cars 10 and 11 of a string of tank cars are connected together. Tank car 11 has a cylindrical tank 15 and a flexible conduit support 12 is attached to the car and carries a lever arm 13 which is connected by a support 20 to a flexible conduit 14 which joins the cars 10 and 11. The flexible conduit 14 has quick disconnect members 87 and 88 which allow the flexible conduit 14 to be broken and the cars to be separated. Each of the tank cars 10 and 11 contain a pair of vents one being an eduction vent which enters through the top of the tank car and extends to closely adjacent the bottom of the tank and the eduction vent is the input vent for supplying liquid into the tank car. At the other end of each tank car, there is a vent conduit which has an inner end which extends into the tank which terminates closely adjacent the upper surface of the tank.

Thus, tank car 10 has a generally cylindrical tank 24 into which an eduction conduit 32 extends with its lower end terminating closely adjacent the lower end of the tank 24. A flexible connection 36 extends from the upper end of the conduit 32 to a suitable supply tank 81 for loading the string of cars. The tank car 10 also has a vent conduit 23 which has a lower end 27 which extends into the interior of the tank 24 and terminates closely adjacent to the top of the tank. The space between the bottom of the vent conduit 27 and the top of the tank 24 comprises a free space or outage 26 for a purpose which will be later described. The tank car 10 has an outlet conduit 82 and a valve 83 for unloading the car from the bottom thereof.

As shown, the vent pipe 23 is connected by the flexible conduit 14 to the eduction vent 18 of tank car 11 which has its lower end 16 which terminates adjacent the lower surface of tank 15 of car 11. Car 11 also has a vent conduit 31 which connects through suitable flexible conduits and the horizontal portion 29 to the next car in the string and so on through any desired number of tank cars which are connected in series. The tank 11 also has an outlet conduit 84 and a valve 86 for loading the car.

The novel apparatus of the present invention comprises installation of a one-way valve in the eduction vents such as 32 and 18 of each tank car. For example, a one-way valve 34 is mounted in an upper portion of tank car 10 and is fluidly connected by L-shaped conduit 33 to an upper portion of the eduction vent 32. Likewise, a one-way valve 21 is connected by an L-shaped conduit 19 to an upper portion of the eduction vent 18.

Figure 2:
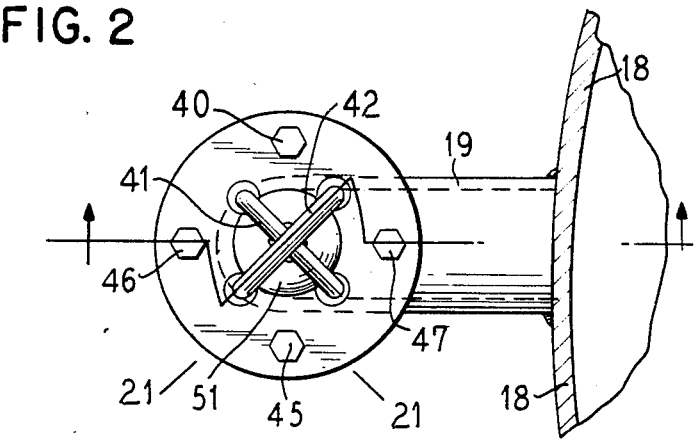
FIG. 2 is a top enlarged view of the valve of the invention.
Figure 3:
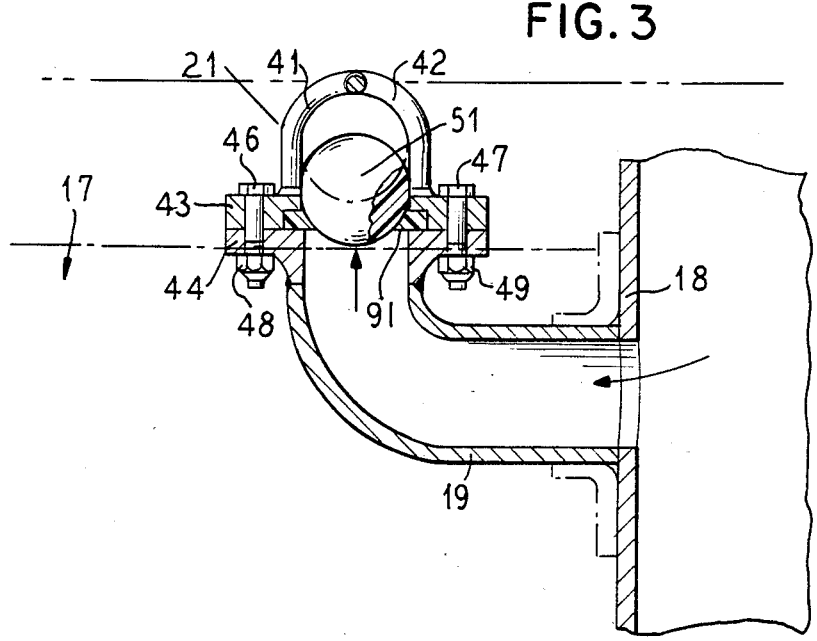
FIG. 3 is a sectional view taken on line III—III from FIG. 2.

As illustrated in greater detail in FIGS. 2 and 3, the valve 21 is mounted on the upper end of the L-shaped conduit 19 which has a flange 44 and a mating flange 43 abuts against the flange 44 and is held by bolts 40, 46, 45 and 47 to the flange 44. Suitable nuts such as 48 and 49 are mounted on the bolts to join the flanges together. A ball valve 51 is moveably supported within U-shaped retaining members 41 and 42 connected to flange 43 and the ball valve 51 is engageable with a valve seat 91 to prevent fluid from passing down into the conduit 19 in a direction opposite the arrow but allows fluid to pass through the conduit 19 from the eduction vent 18 through the valve 51 into the tank 15 of the car 11. The ball valve 51 and the valve seat 91 are made of a material that is compatible with the commodity being transported in the tank car and material such as Alumina or Teflon may be used for most high volume commodities. The cage-like valve formed with the retainers 41 and 42 limits the rise of the valve 51. Replacement of the spherical ball 51 or ball seat 91 can be easily accomplished by unscrewing the bolts 40, 41, 45 and 47 connecting the flanges 43 and 44 and after inserting new valve or valve seat the unit can be re-assembled. The valve and conduit 19 may be connected to the eduction conduit 18 by welding for example.

In operation, the first tank car 10 is connected to a suitable supply 81 and liquid flows through the conduit 36 into the eduction pipe 32 and fills the tank 24 with liquid 28. The lower end of vent conduit 27 establishes the size of the space 26 in the top of tank 24 and when the lower end of the vent 27 has been sealed by the liquid 28 pressure in the space 26 will cause additional liquid supplied to tank 24 to flow up through the vent pipe 23 into the flexible connecting conduit 14 and into the eduction conduit 18 of the second car 11. This continues until the second car 11 is filled to the bottom of the vent conduit 31 after which the free vapor space or outage 22 will provide suitable pressure for forcing the liquid from 17 from car 11 into the next car in the line of cars and so on until all of the cars in the string are filled. Sensing means are provided in the last car in the string so as to indicate when it has been filled to a suitable level at which time the liquid is cutoff from the liquid supply 81. Means are also provided for supplying air or a suitable gas such as nitrogen to the eduction vent 32 from an air or gas supply 96 through the conduit 36 so as to purge and remove liquid from the flexible connecting conduits 14. After the cars have been filled, the air or gas supply 96 is connected to the conduit 36 and gas flows into car tank 24 through conduit 32 and through the conduit 33 out of the valve 34 into the free vapor space or outage 26. Then the pressure within the space 26 causes the gas/air to flow into the vent pipe 23 and to push liquid in the vent pipe and flexible conduit 14 into the eduction vent 18 of the second car 11. Gas passes through the conduit 19 and valve 21 into the outage space 22 until a pressure is established such that the vent 31 and portion 29 and the next flexible conduit joining car 11 to the next car in the string is cleared. This process continues until all of the flexible conduits such as conduit 14 between the cars have been cleared of liquid.

The continuous oscillatory motion of the ball 51 in the valve seat 91 practically eliminates commodity coating of the surface of the ball 51 and its seat 91. This ensures trouble-free performances of the valve over long periods of time. Furthermore by making the ball and its seat of the same material, wear can be minimized and the life of the valve extended. The only moving part in the assembly is the ball itself and there are no intricate elements and, thus, the valve is very durable.

The invention eliminates or minimizes the necessity of blowing air or gas through the liquid commodity in the car during purging of the interconnects and greatly reduces the pressures and quantities of purge gas required. This is because the gas can move through the valves 21 and 34 through the conduits 19 and 33 rather than having to pass through the lower end of the eduction vents 18 and 32 and then pass up through the liquids 17 and 28 in the tank car. Thus, since the gas can pass to the conduits 19 and 33 and valves 21 and 34 substantially lower pressures are required to purge the interconnects 14. Also, the amount of purge gas required is substantially reduced.

By reducing the purge pressure, the length of a string of cars is not limited due to purge pressure requirements and a much longer string of cars can be purged with the apparatus of the present invention than it is possible with prior art systems. Also, since the quantity of purge gas is substantially reduced in those instances where purge gas is other than air are used such as inert gas or bottled gas such as nitrogen the invention results in a substantial saving and cost of gas required.

Although the invention has been described with respect to preferred embodiments, it is not to be so limited as changes and modifications can be made which are within the full intended scope of the invention as defined by the appended claims.

We claim as our invention:

1. Apparatus for loading and purging a plurality of tank cars comprising, an eduction pipe mounted in the tank of each tank car and extending to adjacent the bottom of each tank, a vent pipe mounted in each tank car and its outlet terminating near the top of said tank, a plurality of connecting conduits extending between adjacent tank cars and with first ends connected to the vent pipe of one car and second ends connected to the eduction pipe of an adjacent tank car, means for supplying liquid cargo to one of said tank cars, and a plurality of one way valves with one of each connected respectively to one of said eduction pipes and with an outlet adjacent the top of said tank car, wherein said one way valves allow fluid to pass from said eduction pipe into the upper space of said tank car but prevent fluid from passing from said tank car into said eduction pipe, and wherein each of said one way valves comprise an L-shaped pipe which has one end connected to said eduction pipe and has a second end formed with a valve seat, and a valve moveably mounted to said valve seat.

2. Apparatus according to claim 1 wherein said valve seat is annular and said valve is a ball valve.

3. Apparatus according to claim 2 including a retainer means mounted to the second end of said L-shaped pipe to allow limited movement of said ball valve relative to said valve seat.

4. Apparatus according to claim 3 wherein said ball valve and valve seat are made of the same material.

5. Apparatus according to claim 4 wherein said ball valve and valve seat are made of Teflon.

6. Apparatus according to claim 4 wherein said ball valve and valve seat are made of Alumina.

7. Apparatus according to claim 4 including means for supplying gas or air to one of said tank cars.

8. Apparatus for loading and purging a plurality of tank cars with a gas comprising, an eduction pipe mounted in the tank of each tank car at one end thereof and extending to adjacent the bottom of each tank, a vent pipe mounted in each tank car at the other end and its outlet terminating near the top of said tank, a plurality of connecting conduits extending between adjacent tank cars and with first ends connected to the vent pipe of one car and second ends connected to the eduction pipe of an adjacent tank car, means for supplying liquid cargo to one of said tank cars, a plurality of one way valves with one of each connected respectively to one of said eduction pipes and with an outlet adjacent the top of said tank car, wherein said one way valves allos gas to pass from said eduction pipe into the upper space of said tank car but prevent fluid from passing from said tank car into said eduction pipe, and wherein each of said one way valves has an inlet with one end connected to said eduction pipe near its top within said tank car and has a second end which terminates inside said tank car near the top and which is formed with a valve seat, and a valve moveably mounted to said valve seat to allow purging of said connecting conduits through said one way valves without said gas having to pass down through said eduction pipe and thus reduce the pressure of the gas required for purging.

* * * * *